United States Patent

Silverman

(10) Patent No.: US 7,475,130 B2
(45) Date of Patent: Jan. 6, 2009

(54) SYSTEM AND METHOD FOR PROBLEM RESOLUTION IN COMMUNICATIONS NETWORKS

(75) Inventor: Robert M. Silverman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 11/019,454

(22) Filed: Dec. 23, 2004

(65) Prior Publication Data

US 2006/0143496 A1 Jun. 29, 2006

(51) Int. Cl.
*G06F 15/173* (2006.01)
(52) U.S. Cl. .................. 709/223; 709/217; 709/224; 709/235
(58) Field of Classification Search .............. 709/217, 709/223, 224, 235
See application file for complete search history.

(56) References Cited

U.S. PATENT DOCUMENTS

| | | | | |
|---|---|---|---|---|
| 4,275,449 | A * | 6/1981 | Aish | 703/1 |
| 5,821,937 | A * | 10/1998 | Tonelli et al. | 715/853 |
| 6,336,138 | B1 * | 1/2002 | Caswell et al. | 709/223 |
| 6,393,386 | B1 * | 5/2002 | Zager et al. | 703/25 |
| 6,711,137 | B1 * | 3/2004 | Klassen et al. | 370/252 |
| 6,836,798 | B1 * | 12/2004 | Adams | 709/223 |
| 7,058,843 | B2 * | 6/2006 | Wolf | 714/4 |
| 7,103,003 | B2 * | 9/2006 | Brueckheimer et al. | 370/252 |
| 2003/0023711 | A1 | 1/2003 | Parmar et al. | |
| 2003/0050995 | A1 * | 3/2003 | Mateos | 709/217 |
| 2003/0065767 | A1 | 4/2003 | Pardhy et al. | |
| 2003/0093486 | A1 | 5/2003 | Toure et al. | |
| 2003/0097438 | A1 * | 5/2003 | Bearden et al. | 709/224 |
| 2003/0157896 | A1 | 8/2003 | Mee et al. | |
| 2003/0229688 | A1 | 12/2003 | Liang | |
| 2004/0024867 | A1 | 2/2004 | Kjellberg | |
| 2004/0088386 | A1 * | 5/2004 | Aggarwal | 709/220 |
| 2004/0093408 | A1 | 5/2004 | Hirani et al. | |
| 2005/0086335 | A1 * | 4/2005 | Liu et al. | 709/223 |
| 2005/0165919 | A1 * | 7/2005 | Qian et al. | 709/223 |

FOREIGN PATENT DOCUMENTS

JP 2001-77814 3/2001

* cited by examiner

*Primary Examiner*—Phuoc H Nguyen
(74) *Attorney, Agent, or Firm*—William E. Schlesser; Greenblum & Bernstein P.L.C.

(57) ABSTRACT

A system and method for using network asset management data including device type, location, and link speed for modeling network performance and identifying performance issues. Functionally complete mathematical characterization of a system may be employed to create a system for problem recognition and resolution, wherein disruptive changes to physical and logical system components are only performed when necessary. Mathematical analysis of pings, MIB, and other asset data may be performed separately and the results compared to "self-check", form, and verify the complete mathematical characterization of a network system. The invention may provide projections of performance impacts based upon proposed changes to components in the network. Performance metrics, ping times, MIB data, link speeds, propagation delays, device latency, serialization rates, conversational speeds, conversational utilization and other data are used to model a network for determining or isolating problematic issues and to forecast performance impacts of potential changes to the network.

22 Claims, 12 Drawing Sheets

SYSTEM AND METHOD FOR PROBLEM RESOLUTION IN COMMUNICATIONS NETWORKS

CROSS-REFERENCE TO RELATED APPLICATIONS

This application is related to patent application Ser. No. 11/019,453, filed on Dec. 23, 2004 which is hereby incorporated by reference in its entirety.

FIELD OF THE INVENTION

The invention generally relates to a system and method for troubleshooting communications networks, and, more particularly, to a system and method of monitoring the availability and performance of communications networks to improve the troubleshooting of communications networks.

BACKGROUND OF THE INVENTION

There are at least two types of network problems; outages and poor performance. An "outage" usually refers to an unavailable resource and "poor performance" typically refers to unsatisfactory responsiveness of the system to the user is not within the range set forth in an SLA (service level agreement) or other requirement. Each type of problem may be caused by any of the various types of network problem causes, for example, physical problems, logical problems, or capacity problems. These types of problems may be further characterized by various conditions. A "physical problem" is typically some piece of hardware being broken and either in a failed state, or is intermittently failing. A "logical problem" typically refers to software or firmware not working as intended because of a flaw in design or configuration or customization. Further, "capacity" problem typically implies that a mathematical threshold (actual or artificially limited) in a component or across a set of components has been exceeded in such a way as to adversely affect availability or performance.

Problem management tools have been developed and have been strongest in identifying individual components, as opposed to system-wide conditions, that are contributing to problems. This should not be surprising, as recognition of a problem state caused by an individual component is usually significantly easier than one caused by a problem ranging across multiple components. In fact, the two types of tools most prevalently used for network management illustrate this fact. Examples include console-based tools with iconic displays of the network such as IBM's NetView™, Hewlett-Packard's OpenView™ and also MIB control block reading tools such as Concord's e-Health™ and Lucent's Vitalnet™.

NetView™ and Hewlett-Packard OpenView™ were initially developed in the 1980s and remain cornerstones of network management. These tools, as a matter of routine, poll the network to discover the network's devices along with the communications links connecting the devices. Each discovered device is often represented by an icon and each connection is usually represented by a line on a management console display that then depicts the network. The icons and line are frequently colored red, amber or green (hence the name, "RAG" display for the console) depending on whether the status of the device is down (red), either unknown or functional but compromised (amber), or functioning normally (green). These tools continue polling devices after discovering them, so that the RAG display may change as device reachability changes, thereby providing the operations staff with rapid, easily recognizable notification of changes in network device status.

In the 1990's, as microprocessors became less costly and more powerful, it became possible to embed additional intelligence and storage into network devices. As a result, it became possible to make network devices more "self-aware" in the sense that that they could recognize their own internal state (such as their internal processor and storage condition and utilization as well as their network ports' conditions and utilizations). Moreover, this newly available self-awareness data was formally organized by standards bodies in device control blocks known as MIBs.

At the same time, peer-to-peer protocols such as TCP and APPC were proliferating, which not only allowed the NetView™ and OpenView™ tools to more easily retrieve this new and additional data from the network devices, but also allowed the newly intelligent network devices to send unsolicited, important status information to the management tools for even faster problem notification to the operations staff. As the 1990's came to a close and the millennium passed, network and systems management research and development staffs continued along the path of improving systems management by enhancing the microprocessor-based self-awareness of devices, even formalizing the discipline and calling it "autonomics."

Tools such as e-Health™ and Vitalnet™ exhibit a similar development history to that of the console tools. Like the console tools, e-Health™ and Vitalnet™ are capable of retrieving MIB data. However, unlike the console tools which are intended to provide realtime management of the network, these tools are typically used for trend reporting. The classic use of these tools has, and continues to be, developing "heat map" reports. These reports identify network links whose utilization exceeds some pre-set threshold value over some specified period of time. Usually the purpose of the heat map report is twofold; first, to identify utilization hot spots that may possibly be causes of poor performance; and second, to identify links that may require a speed upgrade, especially since such upgrades often need to be ordered and planned for well in advance of actual installation.

One additional class of problem is the "logical problems." These include design, customization, and configuration problems. Tools to diagnose these types of problems are generally not yet developed. Instances of tools that actually are currently available and may be able to model optimized network routing, such as OpNet™, require significant amounts of time and expertise to run, and are not in general use.

Regarding the current state of the art of network management, the addition of self-diagnosing autonomics and reachability testing has improved both the success rate and speed of diagnosis of broken devices. The commonly known heat map concept, largely unchanged for a number of years, remains generally effective in recognizing and forestalling problems involving overutilization. However, these tools are not one hundred percent effective, and when problems occur which these tools fail to diagnose, resolution efforts often become chaotic and of unacceptable duration. The reason why these problems get out of hand is often because once the tools have failed to provide conclusive diagnostics for a problem, there remains no orderly procedure or method for diagnosis and resolution, with the result being that "all" possible diagnostic paths are followed, which elongates resolution time and increases risk of compounding the problem.

In accordance with the above, the current art of network problem determination may suffer from one or more issues. Such as, when there is a performance or outage problem, it may be caused by a physical problem, a logical problem, or a capacity problem. The remediation for physical and logical problems generally requires replacement or repair of the failed component, whether it is a logic board in a device or a version of software. The remediation for capacity problems generally involves adding capacity or adjusting the tuning of the system. When diagnostic tools fail to pick up the true cause of an outage or an instance of poor performance, the problem resolution effort often reverts to various attempts such as, for example, an across-the-board trial and error method of swapping cards, cleaning cables, changing software and microcode levels, adding capacity, re-tuning the system, and the like. The hope is that one of the changes (usually performed one at a time) may give positive results.

The deficiencies with this methodology include taking too much time, it is risky, and that it tends to pit the hardware, software, and systems staffs against each other. More specifically, by reverting to a shotgun approach when management tools fail to lead to a proper diagnosis of an existing problem, there is risk that the trial-and-error remediation-effort changes made to the system might make the situation worse. For example, when there is a hard or intermittent problem that defies diagnosis, remediation efforts may include reseating cards and swapping or cleaning cables, with each of these efforts exacerbating the problem. Illustratively, reseating a card may result in bending connector pins, thereby worsening the problem. Similarly, cleaning cable connectors, changing microcode levels, or swapping cards risk introducing new problems into the system. Similarly, swapping cable paths to test alternate connectivity may require altering cable switching device settings which is an error prone procedure that can cause additional problems and worsen the situation.

The current methodology for troubleshooting typically includes, for example, examining the RAG console (e.g., NetView™ or OpenView™) for red or yellow icons, which are indicative of devices that are broken or whose status is unknown and repairing whatever is broken. It is also possible to check the heat map report of known over utilized links, and check MIB values for over utilization along the path(s) involved in the problem. As a cure, adding capacity or reducing traffic if there is over utilization of a resource may be instituted. If the problem is not fixed by either of the two previous actions, then in whatever order is approved by management, changes to the system and the metrics of the system may be made (where changes to the system include such actions as reseating, swapping, and replacing hardware and modifying software and microcode; and changes to the mathematics or metrics of the network include adding capacity or changing tuning). In the current methodology, if the use of the management console and MIB tools have-failed to produce a solution, then risky and time-consuming probing and speculative system changes may be attempted, in no particular order, in hopes of a cure.

SUMMARY OF THE INVENTION

In an aspect of the invention, a method is provided for managing a network. The method comprises the steps of modeling performance of a network having one or more network components to locate an instance of a mathematically impaired network component based on any combination of network speed, latency, tuning and utilization, and modifying one or more parameters associated with the one or more network components based on the modeling to improve network performance.

In another aspect of the invention, a method for managing a network performance is provided. The method comprises creating a baseline network model of a network having one or more network components and adding MIB data to the baseline network model to create a model of current conditions. The method further comprises the steps of pinging a path in the network to verify the model of current conditions, identifying optimal tuning for the path based on the model of current conditions verified by the pinging and modifying one or more parameters for at least one of the one or more network components based on the identified optimal tuning to improve network performance at least along the path.

In another aspect of the invention, a system for managing networks is provided. The system comprises means for modeling performance of a network having one or more network components to locate an instance of a mathematically impaired network component based at least on any one of network speed, latency, tuning and utilization and means for modifying one or more network components including at least any one of a network component parameter and network component configuration based on the modeling to improve network performance at least along a path of the network.

In another aspect, a computer program product comprising a computer usable medium having readable program code embodied in the medium is provided. The computer program product includes at least one component to model performance of a network having one or more network components to locate an instance of a mathematically impaired network component based at least on any one of network speed, latency, tuning and utilization and the at least one component to modify one or more parameters associated with the one or more network components based on the modeling to improve network performance.

DETAILED DESCRIPTION OF EMBODIMENTS OF THE INVENTION

Figure 1:
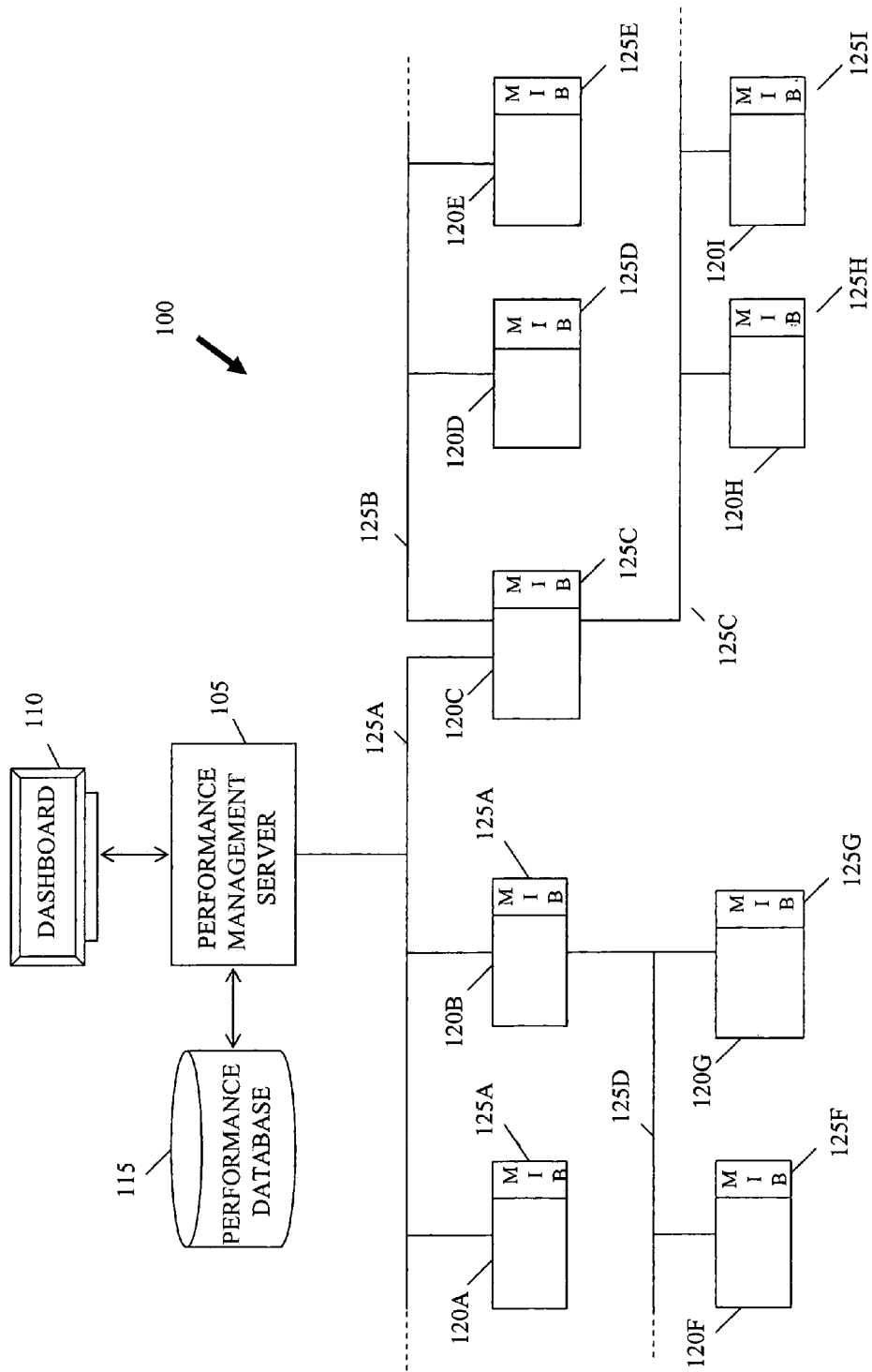
FIG. 1 is a block diagram of an embodiment of an illustrative environment of the invention.

This invention is generally directed to a system and method for using network asset management data (such as from user documentation, Traceroute and other probing discovery commands or techniques, and from network management tools VitalNet™ and Concord e-Health®, for example) including attributes such as device type, location, and link speed for creating a database model of the network's connectivity. This model includes a description of network devices and the communications links connecting them. Each such device-link-device connection is known as a "network hop." Included in the initial setup of the database is data from which baseline mathematical analysis of the network can be performed; including link end point locations (or distance), device locations and device latencies. Pinging is performed using longer and shorter ping packets transmitted in isolation from each other and in short bursts to provide data for analysis of baseline network performance that is independent the documentation and MIB-based baseline analysis.

The "network baseline performance" typically refers to performance of the network (i.e., a network path) absent other users in handling the work of a single new user performing a single, particular task. Baselining thus answers questions such as, "what is the best possible file transfer rate across each end-to-end network path and what is the best possible network-level transaction response time across each end-to-end network path?"

In addition to baseline performance, the system and method also provides for analysis of the network's current performance. "Network current performance" generally refers to the performance of the network under its current utilization in handling the work of a single new user performing a single, particular task. Determining the network's current performance thus answers questions such as, "what is the best possible file transfer rate currently achievable across each end-to-end network path and what is the best possible network-level transaction response time currently achievable across each end-to-end network path?"

In addition to determining baseline and current performance levels of the network, the system and method of the invention enables easy and accurate "what-if" modeling of potential changes to the network, such as the effects on performance of additional traffic, link speed increases, or changes in distance between clients and servers. Building this level of analytic capability into a network asset management database facilitates problem analysis and resolution as well, by providing rapid identification of components that are slowing overall performance across network connections because of queue build up, propagation delay or slow serialization or processing of network traffic.

Once the model of the network has been constructed from the network asset database and verified by analysis of ping results or user traffic, it can be employed in a network management and problem resolution methodology in which the system console identifies broken devices (if any), then the network model identifies any performance issues. By identifying performance problems with a high degree of success, risky trial-and-error system changes performed for the purpose of problem resolution can be held to a minimum using the new methodology.

Thus, the invention provides measured and observed performance data for one or more segments of a network (e.g., one or more hops or end to end) so that identification of diminished performance in the network might be accomplished and problems may be avoided by setting reasonable service level agreements and expectations. The invention also provides for establishing tuning requirements, and by rapidly identifying whether or not poor performance is being caused by the network, and if so, where in the network the problem is occurring and why. Additionally, the invention may provide projections of performance impacts based upon proposed changes to one or more components in the network, thereby facilitating problem remediation with effective network changes.

For the purpose of improving the art, a new distinction is put forth, in which system problems are characterized as mathematical or non-mathematical. The system and method of the invention uses the functionally complete mathematical characterization of a system in order to create a system for problem recognition and resolution in which disruptive changes to physical and logical system components are only performed when necessary. "Mathematical" problem refers to a performance problem resulting from a capacity, utilization, latency, or tuning problem.

The network performance analytics thus provide an opportunity to enhance network troubleshooting techniques so as to limit disruptive systems changes performed during problem determination and repair. In the new methodology, when the network console has failed to provide accurate diagnosis, the complete mathematical modeling of network capacity and tuning may be employed to either fix or rule out potential "mathematical" causes of the problem. If a mathematical change is deemed warranted, (e.g., addition of capacity or alteration of tuning), then the change may be performed with a very high degree of confidence that it will be successful. The system and method of the invention is an improvement on the current methodology. In the methodology prior to the invention, when the RAG console fails to identify a problem, the problem may be mathematical (i.e., tuning or capacity) or else the problem may be a resource that needs to be repaired or otherwise changed, and the problem efforts become confused. In the invention, for the more difficult problems (e.g., those not identified by the RAG console) the system and method may identify whether or not the problem is mathematical, thus lowering the risk and increasing the speed of problem resolution.

As an example, suppose there is a specialized store-and-forward relaying device in the middle of a network connection. Suppose further that it does not contain standard MIBs because of it is newly developed technology and because it may be performing a specialized function, such as converting from an operating system channel protocol to a wide area network protocol. And finally, suppose that its buffers have been set according to vendor-supplied default values and that the number of buffers allocated is insufficient and is causing the connection to fail. Typically, the mathematical aspect of this problem (e.g., assigning an appropriate number of buffers) might not be addressed by the technical staff until a variety of risky, time-consuming physical and logical actions has been performed such as, for example, swapping out hardware and software components or cables cleaned and replaced.

However, the system and method of the invention provides for an improved solution by providing a mathematical analysis of the network derived from its asset management and ping-test data by analytics, described below, so that the propagation delay, streaming speed, conversational speed, and device latencies across the connection may be known. From this data, as is described below, both the window size and the buffer size requirements may be easily (or even automatically) calculated. The tuning requirement for buffer sizes thus may be readily available and the problem may be easily diagnosed or possibly averted to begin with and much of the disruptive swapping, reseating, recustomizing, cleaning, etc. in this example may have been avoided.

In certain aspects, the system and method for problem resolution provides for the at least the following:

Examine the RAG console (e.g., NetView™ or OpenView™) for red or yellow icons, which are typically indicative of devices that may be broken or whose status is unknown.

Check the mathematical model for a network capacity or tuning problem that matches the profile of the problem affecting end users.

If the problem is not fixed by the previous actions, then perform system changes including, for example, swap out cards, swap out devices, change microcode, swap cables, clean communication cables, change the application program, and reseat cards, until the problem is fixed.

FIG. 1 is a block diagram of an embodiment of an illustrative environment of the invention, generally denoted by reference numeral 100. The environment 100 may include a performance management server 105 for running performance tracking, modeling and baselining software. Also included may be a dashboard 110 (i.e., a display) for displaying the monitored network elements and status, and a performance database 115 for storing performance and status data under control of the performance management server 105.

The illustrative environment 100 also may include one or more network links 125A-125D along with various network components 120A-102I such as, for example, network devices, routers, applications, bridges, gateways, servers, or the like, as appropriate to their position and function in the network(s). Each of the network components 125A-125I may also include a management information base (MIB) which is maintained by each network component according to the component's type and role.

In the invention, each hop in the network (i.e., either each hop in the entire network or each hop in end-to-end paths) may be analyzed to provide metrics relevant to each hop's performance over a period of time. These metrics may include, but are not limited to, as one of ordinary skill in the art would recognize:

- Speed of associated with the hop which may include both theoretical and parametrically controlled speeds.
- Propagation delays.
- Device latency.
- Utilization (e.g., as a percentage or ratio of measured to theoretical).
- Packet loss rate.
- Byte rate in. (The number of bytes, or octets, received on a device's network interface over a specific time interval. The time interval is the MIB refresh rate set by the network management and is typically set at 5, 10, or 15 minutes.)
- Byte rate out.
- Packet rate in. (The number of packets received on a device's network interface over a specific time interval.)
- Packet rate out.
- Ping time across hop which may include separate ping times for smaller and larger packets.

Of these metrics, utilization, packet loss rate, byte rates in/out, ping time for hop, and packet rates in/out vary over time. The remaining metrics (i.e., speed, latency, propagation delays, etc.) ordinarily remain constant, unless intentionally modified, perhaps by network engineers.

From the values of these metrics, performance calculations (i.e., one or more performance ratings) may be calculated for a given hop. Once calculated, individual hop values of multiple hops may be used in combination to determine the end to end behavior of a network path in such a manner as to provide understanding of different aspects of the network, including such aspects as:

(i) Characterizing different types of applications and calculating how they will perform on the network (ii) Which network components may be responsible for diminished performance (e.g., a bottleneck node) and to what degree the component might be contributing to the diminished performance.

(iii) Projecting what effect a change to any component (e.g., upgrade or replacement) on any link in the network might have on the performance of the whole end-to-end path.

Networks typically exist to support distributed applications which may be characterized as those applications running code that at some point requires transmission of data to a partner across the network. Data transmission typically commences when the user application program, e.g., open system interconnection (OSI) layer 7, buffers data and issues a "SEND" command, for example, which forwards the data to be transferred across an API (e.g., OSI layer 6) to a function such as transmission control protocol (TCP) or Internet control message protocol (ICMP) in order to start the process of formatting data for transmission to the partner across the network.

Application profiling may be employed to determine the characteristics of traffic presented to the network by applications. Characterizing instances of application traffic in a manner that is both meaningful to the line of business (LoB) staff and measurable by the network staff enables the network staff to turn the data collected by network management tools into precise information about how well the network is meeting LoB requirements. The system and method of the invention, in one aspect, provides for relating network performance data to LoB requirements by processing data about network components into meaningful information about application performance.

Because application profiling may be directly relevant to correlating network performance to business needs, a precise description of the application profiling is also provided by the system and method of the invention. According to the invention, applications may be profiled comprising sets of units of work, each of which requires a specific number of bytes to be transmitted and received in a specific number of turnarounds (trips across the network) for completion. Examples of units of work to be performed by applications include, but are not limited to:

- Conversational units of work comprising of a single transmission of "m" bytes and a single receipt of "n" bytes (e.g., a TN3270 query/response)
- Multi-turnaround conversational units of work comprising "p" turnarounds with a total of "m" bytes transmitted and "n" bytes received (e.g., a SQL-based retrieval of data base rows using acknowledge and "get-next" function)
- Streaming units of work consisting of "n" megabytes of data to be transmitted (e.g., file transfer applications)

The system and method also provides for network components to be characterized such that computation of their performance in support of application units of work may be provided under one of more of the following:

- Baseline conditions are a characterization of the component while experiencing zero utilization when the new unit of work is presented.
- Current condition is a characterization of the component when the unit of work is presented to the component while it is experiencing a current (e.g., a known) level of utilization.
- What-if conditions is a characterization of a component or components in which performance of a unit of work under changed conditions is computed for modeling purposes.

According to the invention, network component performance computation may be performed based upon the component's fixed metrics (e.g., speed, device latency and/or distance) and variable metrics (e.g., utilization, average packet size and/or packet loss rate). Moreover, the component's ability to perform units of work under baseline, current, and what-if conditions may be computed from the component's fixed and variable metrics. The component's fixed metrics are typically derived from asset management data and may be altered when a change to the asset is made. The variable metrics may be derived from MIB data and may be changed each time there is an SNMP "get" for the MIB, which usually takes place approximately every 5 to 15 minutes, but may vary. Application profile characteristics may also be derived from traces, application traffic flow analyzing software, application documentation, or application designers. Once the network model for baseline and current performance has been set up, network problem resolution may be facilitated with a methodology in which the system console and the mathematical model are employed to locate broken devices and capacity/tuning problems, so that risky trial-and-error type problem resolution is limited and overall network availability is maximized while operational and equipment costs are minimized.

Dashboard Considerations

The management staffs for LoBs and management staffs for the network may require different dashboards (e.g., 110) which reflect statuses according to their area of interest or concern. For example, if a link in a path is down and an aftermath route with adequate performance is carrying user traffic, then from the perspective of the network manager there is a red condition (i.e., link down) and from the perspective of the LoB manager there is a green or yellow condition. Or, the LoB manager may see a yellow condition if there is lost or delayed traffic.

Since LoBs typically pay for the network directly or indirectly, the LoB's management usually wants to know how effective the network is in support of their business. The LoB's management may want to know that the network consistently reaches all required parties with an appropriate level of security, perhaps enforced by a service level agreement (SLA) for reliability, resiliency, performance, and cost effectiveness.

In response to today's LoB management needs, network managers may deploy firewall-protected IP networks with link and component redundancy, as is generally known. Measurement of network performance may be accomplished by transmitting pings (e.g., echo packets) and collecting MIB data (e.g., device control block counter records). The measurement process may be controlled by a performance management server 105 with results stored in performance database 115, for example.

Pings often serve to answer questions about availability and performance, because when pings cannot successfully make their round-trip journey it is typically a result of unavailability of some network component, and when pings do succeed, their round trip time results may be stored and then compared in order to ascertain the level of performance at the time of the ping's transmission. However, unlike user-application traffic, which is often TCP-protocol riding on the IP network, pings are ICMP-protocol over IP and are prone to suffer delays and discarding that are not representative of what the actual user traffic is experiencing. Despite the fact that pinging does not provide an exact measure of the network's performance and availability, pings are easy and inexpensive to perform and represent the network's performance and availability well enough to be of significant value.

While pings are most often performed to reflect end-to-end performance, MIB data reflects the state of the network device-by-device and port-by-port across the network over user-specified time intervals. Of particular interest for performance and capacity management, MIBs collect and record traffic and discard rates by time interval from which resource utilization may be easily deduced. If pings are being dropped, or if ping round trip time is taking more time than usual; then MIB analysis may be performed along the ping path to determine which (if any) specific component along the network path is suffering discards or over utilization. MIB data whether standalone or in tandem with pings, thus serves as a cornerstone for problem, capacity, and performance analysis. Ping analysis serves to provide a checking mechanism for the mathematical analysis based on the network asset database and MIB data.

Network performance may be defined in terms of metrics. For example, a ping performed at 9:30 AM that takes 835 ms to complete may be compared with the 562 ms ping of 7 AM. A link, whose utilization is peaking at 92%, or other predetermined threshold, may be flagged for upgrade. Moreover, a third-party measurement indicating that web application response time is sub-par for the industry may trigger a call to a provider of edge network services. In all of these examples, a technical analyst or manager uses a measurement as a foundation for a decision.

The system and method of the invention provides for drawing correct inferences from network measurements, whether the inferences concern problems, tuning, service levels, or modeling of proposed changes. The system and method provides for at least the following:

determining network metrics for single and multi-hop connections, computing the composite effects of a connection's metrics on the various applications it serves, following an algorithmic procedure for thorough, economical problem resolution, and providing a method for precise determination of where and when to invest in infrastructure.

Further, newer tools, capable of capturing traces and storing all packets seen on an interface may be included, thereby extending and maximizing use of the current tool investment while providing an orderly path for investing in and implementing newer tool technology where and when it makes sense. Moreover, the system and method provides the foundation for aligning network service level management with business requirements and provides the foundation for intelligent, accurate, and proactive problem avoidance and resolution.

Collecting Network Performance Data

Network performance data typically comes from one or more sources that may include pings, MIB data, trace data and user documentation.

Pings

Pings include echo packets transmitted and received by ICMP, which also calculates the ping's total round trip time. Since ICMP is usually a component of virtually all TCP/IP stacks, if a user has access to a device capable of transmitting pings, and if pings are not blocked by router filters, then nearly all IP devices respond to that device's pings. Simply stated, pinging is generally available everywhere, it is inexpensive, and it is easy to use.

One ping strategy is to use a generally known "Traceroute" command to determine the presence and order of routers, for example, along a path, and then based on the determination, for transmitting pings from the test station source to each router along the path and then to the end point target. In this way, it is possible to observe the build up of delay along the path.

In general, if a number of pings are performed to a target, the ping from that group of pings with the minimum round trip time represents the best possible time through the network, and, thus, represents fundamental base physics of the network characteristics. Since all pings to the target undergo the same base network physics, if a ping takes more than the minimum time to traverse the network, all of the additional time is comprised of time spent on network queues waiting for service from a network facility that is busy While pinging may be highly informative, there are limits that should be considered. Each limit reflects some aspect of the fundamental fact that pings are not end user traffic. First, pinging overhead might, itself, stress the network. Pinging to test a poorly performing, and possibly already over utilized network may be contribute to the poor performance. Second, ping tests having routers as targets or origin points may show significantly higher latency and packet drop rates than the actual user traffic in the network is receiving. This higher latency is typically because unlike user traffic handled by a router, pings to a router go through the router's ICMP stack where the pings are handled at very low priority. Third, for ping tests to end station targets, if actual user applications are running on TCP, then ping testing can only mimic the end-to-end performance by measuring ICMP performance. Moreover, the router path for ping ICMP traffic may differ from the router path taken by user TCP traffic. Fourth, pinging of resources typically takes place generally every few minutes. If spikes of traffic occur that last for a minute or less, pinging may be unable to identify them. This fact makes the ping methodology less effective for diagnosis of certain high profile performance problems such as multicast microbursts on brokerage trading floors and temporary traffic spikes affecting web sites.

MIB Data

MIB data typically resides in control blocks of routers and other network devices. Examples of MIB data may include counts of bytes in and bytes out at an interface during a fifteen minute interval and measurements of router CPU utilization. Device MIBs are polled by SNMP in order to collect performance data for use in analysis or trending.

However, unlike pings, which are not user traffic, MIBs have the advantage for the network analyst of comprising statistics that are counts and measures of actual user traffic and device status. But, while pings provide a fast and easy means for obtaining a depiction of end-to-end performance, MIBs only give a detailed view of individual components, and there is currently no systematic method to derive end-to-end performance evaluations from MIB data. The system and method provides an analytical method for analyzing a communications network (i.e., its end-to-end network connections) using MIB data. Further, the system and method provides for using ping analysis as a checking mechanism to overcome known inaccuracies of MIB data. It is a further purpose of the invention to use results of the new MIB analysis method to overcome known inaccuracies in ping analysis.

Numerical Analysis of Single and Multi-Hop Network Paths

The system and method of the invention provides for performing numerical analysis on a network path that includes at least determining the speed, length, device characteristics, and utilization along the path, which may include numerical analysis of single hop paths and/or numerical analysis of multi-hop paths.

Single Hop Path Analysis

Single hop analysis may be of value for the following two reasons. First, any detailed analysis of a multihop end user connection typically requires an understanding of the component hops. Second, it is possible to construct an accurate view of a multi-hop end-to-end connection from the sum of its individual hops. However, additional considerations may be required for determining network performance over multi-hop connections which are described in the Multi-hop Analysis section below.

Single hop connection performance may be characterized by four metrics, as discussed further below. These four metrics include link speed, propagation delay, device latency, and utilization (which relates, by mathematical function, to performance impacting queuing).

Link speed

Link speed may be determined by the clocking of connectivity such as the modem (analog link), digital services unit (DSU)/channel services unit (CSU) (digital link), network interface connection (NIC) (LAN), or Gigabit Interface Converter (GBIC) (fiber channel). The clocking speed determines the rate at which the byte stream on the link outbound queue of the business machine is sliced into bits and placed on the network. The time it takes to turn the transmitted message's bytes into bits is called serialization time. The formula for serialization time for a message may be mathematically stated as:

$$(\text{Bytes serialized} * 8)/\text{link speed} = \text{serialization time} \quad (\text{Eq. 1})$$

For example: a 1200 byte message that is transmitted one way across a single hop network using 19.2 kbps modem results in a calculation of:

$$8*1200=9600/19200=0.5 \text{ sec.}$$

Propagation Delay

Propagation delay is proportional to the distance traveled by the signal propagated by the exemplary NIC, modem, DSU/CSU, or GBIC. In wide area networks, signals usually travel at slightly less than half the speed of light, and a good formula for estimating a wide area network connection's propagation delay may be described by:

$$(\text{Link distance}/186000)*2.1 = \text{propagation delay} \quad (\text{Eq. 2})$$

For example, a propagation delay for a data link connecting New York City and San Francisco (a distance of approximately 2582 miles) may be calculated by:

$$(2582 \text{ miles}/186000)*2.1 = 29 \text{ ms one way propagation delay, estimate.}$$

Device Latency

Device Latency is the processing time devices along the transmission path required to handle the packet. For routers in the middle of a connection, packet handling may involve receiving the packet, performing checksum processing, and determining through which port to forward the packet. In first generation routers, portions of this processing are performed by the router's CPU, and average processing time per packet is 4 ms. More recent routers process packets without CPU intervention, and device latency is typically less than 1. mc, even when sophisticated functions such as QoS (quality of service priority queueing) are employed. Similarly, at the end points of the network, where TCP or ICMP layers may be involved in the transmission, 3 or 4 ms device latency used to be common in older devices, but in today's end devices, device latency is generally also significantly less than 1 mc. A notable exception is when pinging routers. When a router is the target of a ping, its processor is typically involved in the handling of the ICMP packet, and this is done at the lowest priority. Routers, when pinged usually show higher latency and greater proportion of packet loss than when they are simply mid-network forwarders of traffic.

Utilization

Utilization affects user traffic because when a facility providing a service is already in use by others, new traffic arriving at that server must typically wait in queue for service until the old traffic has been processed. The effect of utilization on a single hop connection is straightforward. Whatever is in use by others is not available to a new user. If utilization of a 19.2 kbps link is 30%, then 70% of the link is available, so available bandwidth is 0.7*19200=13440 bps available bandwidth. Calculating performance based upon the available bandwidth gives a result that includes serialization time plus queue effect. For example, if a 19.2 kbps link is 50% utilized, then the available bandwidth on the link for new traffic of a 1200 byte packet entering that hop requires queuing and serialization time of:

0.5*19200=9600 bps available bandwidth, and since a 1200 byte packet is 9600 bits in length (1200 bytes*8 bits), and the formula for queue plus serialization time is:

message size/available bandwidth=queue time plus serialization time    (Eq. 3)

resulting in:

9600 bits message/9600 bps bandwidth=1 sec. queue time plus serialization.

Moreover, since queue time plus service time equal 1 second, and since the link speed is 19200 bps, when the 1200 byte message was serialized into 9600 bits, it took 0.5 seconds for the serialization to take place. Since serialization plus queue time totaled 1 second, and since the serialization portion was 0.5 seconds, then queue time was therefore also 0.5 seconds.

Multiple Hop Path Analysis

End user traffic is often varied in nature and usually traverses several hops in its end-to-end network path. In order to more correctly set service level agreement thresholds and correctly apply numerical analysis to network data, it may be necessary to understand how different types of user applications behave in multi-hop networks.

Figure 2A:
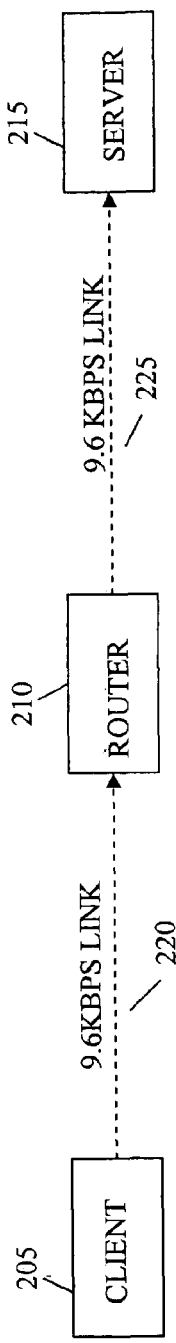
FIGS. 2A and 2B are illustrative embodiments of a two hop client to server connection via a router.
Figure 2B:
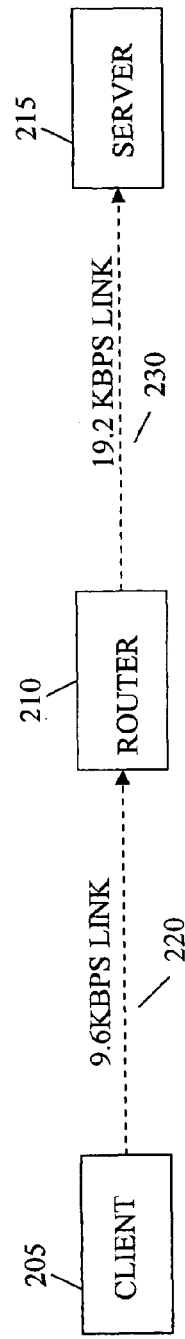

FIGS. 2A and 2B are illustrative embodiments of a two hop client to server connection via a router. FIG. 2A shows the two links of the two hops 220 and 225 having the same speed (i.e., 9.6 kbps) while FIG. 2B shows a similar configuration with the second hop 230 having a different speed of 19.2 kbps from the speed of first hop 220 (i.e., 9.2 kbps).

Referring to FIG. 2A, if a user at the client 205 transmits a 1200 byte packet to the server 215, the network speed (serialization rate) end-to-end across the connection is therefore 4800 bits per second. However, the network speed (serialization rate) for a file transmitted from the client 205 across the network to the server is 9600 bits per second.

The results of these two seemingly equivalent examples of FIG. 2A are different (reasons discussed below) which implies that that for multi-hop networks, from an end-to-end perspective there is no single "correct" answer to the question, "What is the speed of the network?" The answer depends on the type of application, and may be different for conversational, bursty, and streaming applications. This has profound implications for service level agreements.

A reason for the different speeds for the two different illustrative applications may be found in the manner in which current generation routers process packets. When a current generation router receives a packet, the router receives the entire packet before processing it. The router may perform algebraic checksum processing to determine it any bits have been lost or corrupted. If damaged, the packet is simply discarded. If not lost or corrupted, then some additional processing may be performed to route the packet out of the right port to move it along the path. Further processing may be incurred to handle maximum transmission unit (MTU) fragmentation or QoS queuing. Earlier, the sum total of this processing was referred to as "device latency," and in the latest generation of routers, this processing often takes place in sub-millisecond time.

While sub-millisecond device latency is not a significant issue, the fact that the router pulls in the entire packet before processing the packet, is quite significant because it means that the router is performing a store-and-forward operation. The implication of this is that in multi-hop, layer 3 networks, packets are re-serialized at each hop. So, the seemingly contradictory results of FIG. 2A above may be explained because the 4800 bps result comes from the fact that when the client 205 transmits the 9600 bit packet, there is one second of serialization time required to get it to the router 210. After the router 210 receives and processes the packet, the router's modem re-serializes the packet and forwards it to the server 215. This re-serialization takes another second. In this exemplary network, it takes a total of two seconds of serialization end-to-end to transmit a 9600 bit packet. Two seconds of time to perform 9600 bits of work means that the end-to-end serialization rate is therefore 4800 bps.

However, for streaming applications, such as file transfers, the serialization rate of the network approaches the speed of the bottleneck facility in the connection path. In the second example of FIG. 2A, there are two 9600 bps links, which comprise two equal bottlenecks, so the speed of the network from the perspective of a streaming application is 9600 bps.

Still another perspective of speed in multi-hop networks is packet handling over distance (PHOD). A convenient vehicle for PHOD measurement is an end-to-end handling of a 1000 byte ping, which may be referred to as the network's "1kPHOD speed." As an example, suppose a network has an end-to end distance of 3000 miles comprising two T1 hops and that the two end stations and the router in the middle of the network each have 500 microseconds device latency. Assuming the network running at zero utilization (i.e., that it is empty of traffic of other users), the round trip ping time and 1kPHOD speed may be characterized as follows.

Round trip time is "double" the one way time (assuming the outbound and inbound paths are identical). One way time includes the sum of the device latencies, the propagation delay, and the serialization times incurred one way across the path. In this case, in the one way path:

Device latency total is 3*0.0005=0.0015 sec;

Propagation delay is (3000 miles/186000 mps)*2.1 (adjustment factor)=0.0339 sec;

Serialization time for the first hop is 1000 bytes*8 bits/1536000 (typical and known usable $T_1$ bps) =0.0052 sec;

Serialization for the second hop on the one way path is 1000*8/1536000=0.0052 sec, so total 1 way serialization is 0.0104 sec (first hop plus second hop);

Total one way ping time is: 0.0015+0.0339+0.0104=0.0463 sec.

Total round trip ping time is (double the one way time)=0.0926 sec;

PHOD speed=work done/time taken. So, round trip PHOD for a 1$k$ packet is:

1$k$ PHOD speed=1000 bytes*2 way*8 bits/ 0.926=16000/0.0926=172786 bps.

Likewise, if a network 800 miles long but identical in all other respects to the previous example, were tested, the network's 1000 byte one way ping time would be 0.0209 sec, the total (round trip) ping time would be 0.0418 sec and 1k PHOD speed of this (identical other than distance) connection would be 382775 bps.

Network analysts often refer to 64 byte ping results across a network as defining the network's latency. Since many service level agreements are based on round trip ping times for short (often 64 byte) pings, an individual short ping therefore represents a round trip time along the path for (i) device latency, (ii) serialization, (iii) propagation delay and (iv) queuing along the path. In contrast, however, the best ping time from a "large" set of pings along a path represents the round trip time for (i) device latency, (ii) serialization, and (iii) propagation delay, and absent any queuing.

Furthermore, while pinging provides a reasonable depiction of how conversational applications (such as TN3270 query-response) behave across a network connection, individual pings do not by themselves provide a reasonable means for estimating performance of streaming applications (such as file transfer protocol (FTP)) and their behave on the same connection. The ping-based calculation examples of PHOD speed above show this plainly—an 3000 mile network has a PHOD speed of 172.8 kbps and the otherwise identical 800 mile network has a PHOD speed of 382.8 kbps, while in fact the streaming speed of each of these networks (the speed at which large file transfers could be handled) is the same and approaches T1 speed of 1532 kbps.

Therefore, one might conclude that streaming applications across well-tuned connections are substantially impervious to numbers of hops and distance; whereas, pings and conversational applications may be highly sensitive to numbers of hops and distance. When setting up and then measuring compliance to service level agreements, pings, at best, sometimes accurately represent a portion of end user experience, and rarely accurately depicts the full range.

The limitations of pinging may be further illustrated by looking at end-to-end utilization. Consider the example of FIG. 2B, which shows a two hop network 220 and 230 with unequal link speeds (i.e., 9.6 kbps and 19.2 kbps). The streaming speed of a connection is effectively the speed of its bottleneck facility, so in this connection the streaming speed is 9.6 kbps. The conversational speed of the network may be calculated by determining the serialization rate for a packet, without consideration of device latency or propagation delay. Conversational speed may be calculated by dividing the number of bits in a packet by the total serialization time for that packet across the network. Without loss of generality, consider a 1200 byte packet. Its 9600 bits have a serialization time of 1 second on the first hop and 0.5 seconds on the second hop, for a total serialization time of 1.5 seconds. So, the network's conversational speed according to the invention, is 6400 bps as shown mathematically as:

$$\text{work performed/serialization time} = 9600 \text{ bits}/1.5 \text{ sec.} = 6400 \text{ bps.} \quad (Eq. 4)$$

Suppose, for example, that on average during a fifteen minute interval there is 0% utilization on the 9.6 kbps portion of the network (e.g., link 220), and 50% utilization on the 19.2 kbps portion (i.e., link 230) of the network. Then, according to the system and method the current available bandwidth from a conversational application's view may be understood and calculated as shown by the following explanation.

Since serialization time across the 9.6 kbps hop with 0% utilization for a 1200 byte packet is 1 second and serialization time across the 19.2 kbps hop with 50% utilization is also 1 second, and because the currently available bandwidth is 9.6 kbps (i.e., 50% of the 19.2 Kbps facility is what is, on average, available to the user), then under this exemplary current utilization, end-to-end serialization time is 2 seconds for a 1200 byte packet. Therefore, based on the 1200 byte packet size:

$$\text{currently available conversational speed} = 9600 \text{ bits (work done)}/2 \text{ sec (total time)} = 4800 \text{ bps.} \quad (Eq. 5)$$

Since the network's conversational speed is 6400 bps (from Eq. 4), the conversational utilization end-to-end is:

$$(1-(\text{currently available conversational speed/conversational speed}))*100 = (1-(4800/6400))*100 = 25\% \text{ conversational utilization.} \quad (Eq. 6)$$

Therefore, from a streaming application viewpoint the currently available network bottleneck is 9600 bps, which is what is currently available on the 9.6 kbps hop (i.e., link 220) at 0% utilization and also what is currently available on the 19.2 hop (e.g., link 230) at 50% utilization. From the streaming application viewpoint, the current utilization is 0% because the network's streaming speed=9600 bps and the currently available network speed is 9600 bps so that streaming utilization=(1−(9600/9600))*100=0.

From this illustrative example, the end-to-end effect that utilization on a network hop has on streaming and conversational application traffic is quite different, which means that from the end-to-end perspective in multi-hop networks there is no single number that represents utilization. Rather, utilization, according to the invention, is better described by a separate calculation for the conversational and streaming speeds of the network.

From the SLA perspective, it becomes clear that pinging, which at best reflects aspects of the behavior of conversational traffic, may not alone be a solid foundation for SLA construction or SLA monitoring of the totality of end user experience. Similarly, extrapolating the effect of utilization of an individual component on performance of an end-to-end connection from MIB data is often impossible and calculating device latency or propagation delay from MIB data is impossible. The system and method merges ping and MIB data, advances the art, and provide the comprehensive view that reconciles these deficiencies and provides a sound foundation for SLA formation and evaluation, with the benefit of also providing a sound foundation for problem detection, problem analysis, tuning, and capacity planning.

Numerical Analysis of Networks using MIB Data and Ping Results

In order to manage networks it is desirable to understand both the baseline ability of the network to support end user applications and the ability of the network under current (load) conditions to support end user applications. The following data input provides the foundation to ascertain this information:

identification of the network paths to be managed by the specific routers and ports that form the path, collection of MIB data at these ports for duration of the timed interval and bytes in and out per timed interval and dropped packets per timed interval, pings taken in isolation of each other of longer and shorter length, the longer of which is not to exceed the MTU size of any interface along the path, and user documentation or MIB data specifying the (inbound and outbound) speed at each interface.

Given this input, the system and method provides for analysis that may be performed for each such path that computes the following output which includes:

the baseline and currently available streaming speed for the path, the baseline and currently available conversational speed of the network, the latency of the network, comprised of the device latency plus propagation delay along the path, the current streaming utilization of the path, the current conversational utilization of the path, and the current queue time along the path.

The output above may be used as input to application, tuning, and capacity modeling analysis having one or more of the following outputs, according to the invention:

the baseline and current performance of streaming applications, the baseline and current performance of single and multiple turnaround conversational applications, the tuning of streaming applications under baseline and current conditions, and 'what-if' modeling for all of the above for any combination of user-specified changed conditions for server or client moves and adds, changes in user traffic, and changes in link speeds.

To determine multihop, end-to-end performance using MIB and user documentation data we use the following data and formulas. Without loss of generality, consider a four hop network with hops a, b, c, and d. Let (sa, sb, sc, sd) be the set of hop link speeds along the network path.

Let (la,, lb, lc, ld) be the length in miles of the network hops. In a four hop network there will be five devices end-to-end across that network. Based on current technology speeds, we attribute 0.1 ms device latency round-trip to each device along the path.

Again without loss of generality, let each hop be half duplex (so that utilization on each hop is its cumulative inbound and outbound utilization), and let (ua, ub, uc, and ud) represent the hop utilizations along the network path. Note utilization is expressed as a decimal value. So if utilization of hop a is 60%, then ua=0.6.

Then, minimum (*sa, sb, sc, sd*)=path streaming speed denoted as "*S.*"

1/(1/*sa*+1/*sb*+1/*sc*+1/*sd*)=path conversational speed, denoted as "*C.*"

(Number of hops+1)*0.1 ms=path round-trip device latency estimate, denoted as "*L.*"

[((*la*+*lb*+*lc*+*ld*)*2)*2.1]/186,000=round trip propagation delay estimate denoted as "*P.*"

S, C, L, and P, are derived above purely from MIB and user documentation and comprise the network's baseline performance parameters from which baseline performance, tuning, and what-if modeling can be performed.

As an example of a baseline analysis,

Let sa=9600, sb=19200, sc=19200, and sd=9600 (all speeds are bits per second).

Let la=500, lb=1000, lc=1000, and ld=500 (all distances are in miles).

Then, min (9600, 19200, 19200, 9600)=9600 bps=*S*.

And, 1/(1/9600+1/19200+1/19200+1/9600)=3200 bps=*C*.

And for the four hop network, (5*0.1)=5 ms=*L*.

And (500+1000+1000+500)*2*2.2/86000=71 ms=*P*.

S, C, L, and P comprise the baseline values for the network's performance in this example.

Performance analysis is performed for conversational applications (such as query-response and transactions) and for streaming applications (such as file transfer, remote disk replication, and print) as follows:

Baseline Conversational Application Analysis

Suppose a transaction consists of a 200 byte (i.e., an octet consisting of 8 bits) query and a 1400 byte response. Then the total number of bytes per transaction is 200+1400=1600 bytes=12,800 bits. The conversational rate C of the network is 3200 bps, so total serialization time for the query response will be 12800 bits/3200 bps=4 seconds.

Round trip device latency L=0.005 sec, and round trip propagation delay P=0.071 sec.

Total network round trip time for the query response=4+ 0.005+0.71=4.715 sec. This baseline value represents the best possible network response time for this query-response application. If there are active users on any portion of the network, queueing delays will be introduced and the average response time will increase, which is covered below in the current conversational performance section.

Baseline Streaming Application Analysis

The baseline streaming speed of the network is fully described by S=9600 bps. The tuning of the network includes window size analysis. For windowing protocols, such as TCP and SNA, the baseline window size (in bits) is equal to the number of seconds it takes for the round trip acknowledgment function to complete multiplied by the streaming speed of the network. As an example, if a window size pacing request is included in a file transfer packet of 1500 bytes, and the window size pacing acknowledgment is included in a 64 byte response packet, then the acknowledgment time in the network is [(1500+64)bytes*8 bits/C]+D+P=3.91+0.005+ 0.071=3.986 sec. The acknowledgment window is 3.986*S=3.986 sec*9600 bps=38266 bits=4783 bytes window size required as tuning to allow a streaming application to keep the network filled (and thus allow the file transfer to complete in as short a time as possible).

Often, a window size is best expressed as a number of packets to be allowed into the network on the connection. In this example, the file transfer application packet size is 1500 bytes. Since the window size is 4783 bytes, this means that the number of packets that can be sent between acknowledgments is window size bytes/average packet size on this connection=4783/1500=3.19 packets. To keep the network full requires rounding up to a packet window size of 4. By deriving the window tuning value that governs application performance, it becomes possible to compute the additional network tuning parameter of network device buffer sizes required. The buffer requirement estimation is computed for each connection using the buffer as follows:

[(2*number of packets per window)−1]*connection packet size=buffer requirement for this TCP connection.

The reason for the (2*number of packets per window)−1 portion of the calculation is that in the "worst case" buffering scenario, a full window is transmitted, the first packet in the window in the acknowledged, but the remaining packets for some reason remain in the network buffer, and when the acknowledgment is received by the sender, another full window is sent. In such a case, two times the packet window minus 1 packet must be buffered in the network. In the example above, the file transfer connection has a packet window of 4 and an average packet size of 1500 bytes so the computation of network buffers required in devices along the path for this connection is [(2*4)−1]*1500=10500 bytes. To estimate total buffers required for a network device requires estimating the number of connections using the device and their window requirements, performing the calculations described, and summing the results.

Baseline What-If Modeling Analysis

Modeling of potential baseline changes to the network is easily accomplished by substituting any proposed value change, such as increases in link distance(s) and/or link speed(s) and applying these values into the formulas provided. Thus, by using the new methodology described above to analyze the basic values for link speeds, and distance inherent in an asset management database, a complete baseline network analysis can be performed, including baseline tuning and modeling.

Current Conversational Application Analysis

Analysis of current conversational application performance on the network may be performed with a calculation similar to the baseline conversational analysis. Latency and propagation delay calculations are unchanged. The serialization calculation is modified to reflect the currently available bandwidth, which is the amount of bandwidth available when average current utilization (consumption of bandwidth by other users) is subtracted. Using the values from the example above, $sa=9600$, $sb=19200$, $sc=19200$, and $sd=9600$ (all speeds are bits per second), $D=0.005$, and $P=0.071$.

The variable that governs queuing impact on current performance is link utilization. Suppose that the link utilizations for (a, b, c, d), denoted as ua, ub, uc, and ud are, respectively 20%, 60%, 10%, and 0%. Expressed in decimal, ua=0.2, ub=0.6, uc=0.1, and ud=0. Then the currently available network speeds for each hop are calculated as:

$\{[(1-0.2)*sa], [(1-0.6)*sb], [(1-0.1)*sc], [(1-0.0)*sd]\}=(0.8*9600), (0.4*19200), (0.9*19200), (1*9600)=(7680, 7680, 17280, 9600)$=currently available link speeds.

The currently available conversational rate of the end-to-end connection is:

$1/[(1/7680)+(1/7680)+(1/17280)+(1/9600)]=2301$ bps=currently available conversational network speed.

The general formula for currently available conversational rate is:

$1/[(1-(ua*sa))+(1-(ub*sb))+(1-(uc*sc)+(1-(ud*sd))]$.

All analysis of the network's conversational applications' performance would proceed exactly as above with the exception that the value for the network path's currently available conversational speed would be substituted for the network [path's conversational speed.

Multiple Turnaround Conversational Application Analysis

Certain transactions require a number of "handshakes" across the network before they complete. These are known as "multi-turnaround" applications. An example might be a cross-network database operation between a sender and receiver requiring retrieval of multiple database rows in which each row received must be acknowledged before the sender can transmit the next row.

Performance of conversational applications, including multi-turnaround, according to the invention may be computed and modeled as follows:

i) User inputs total bytes in (from client) and total bytes out (from server) per entire transaction (i.e., including all turnaround portions of the transaction). Total bytes per entire transaction is denoted as "b."
ii) User inputs number of turnarounds per transaction, denoted as "n" (usually one in 3270 query/response-type transactions).

Then, the best possible network time per transaction (i.e., baseline value with no queue delay at any hop) is:

$(b*8/C)+(n*(D+P))$=best possible network response time for any conversational transaction, including multi-turnaround.

The average transaction time under current conditions in a network connection with h hops is:

[(bytes per total transaction*8/current available conversational speed)+(device latency+propagation delay)]*n=transaction time under current conditions. This is expressed for the general case as:

$\{[b*8/\{1/\{[(1-(ua*sa)]+[1-(ub*sb)]+\ldots+[1-(uh*sh)]\}\}]+(D+P)\}* n$ time to perform an $n$ turnaround transaction across a network path of $h$ hops under current network conditions.

Streaming Application Performance Analysis Under Current Network Conditions

In the example above, under current utilization, the network hop speeds are (7680, 7680, 17280, 9600)=currently available link speeds. The current streaming speed of the network in the example would be:

minimum (7680, 7680, 17280, 9600)=7680 bps.

All streaming analysis for window size and buffer tuning would be performed exactly as in the baseline streaming case above, simply substituting the current streaming speed value for the baseline streaming speed value.

The methodology for baseline and current network analysis based upon MIB and user documentation data input that is described above enables easy and accurate end-to-end network analysis. However, if the data input is incorrect, analysis performed on the data will provide incorrect results. So it is, methodologically, worthwhile to have a means of checking the input and results. This may be done with pinging.

Ping Verification Methodology

Ping analysis can be performed end-to-end across a network and also, with currently available technology, hop-by-hop across a network path. Without loss of generality, a method using hop-by-hop pinging is described herein as a technique of both analyzing the network and verifying the MIB and user documentation-based analysis described above.

Pinging may be performed from the router (or other Layer 3 device) at one end of the hop to the router (or other Layer 3 device) at the other end of the hop, for all hops along the network path to be analyzed. The MTU size along the path may be discovered using well known techniques. (MTU is the maximum network packet size.) In all instances below, no pings greater than the MTU size are transmitted. And in the preferred embodiment, data compression may be employed during the pinging to minimize the effect of any other network compression that betaking place along the path.

For each hop along the path, testing is performed as follows: Longer pings and shorter pings are sent in isolation from each other over a period of time of sufficient duration to accomplish both (a) and (b) below:

(a) convince the user that additional testing will not produce a faster instance of round trip time for the longer or shorter ping (in other words, the user is convinced that instances of the best possible long and short pings have been observed), and (b) the sampling duration is of sufficient length that any calculations of average network performance values based on the ping samples will be meaningful. For the purpose of using the ping samples to verify the MIB-computed analysis, it is preferable that the ping sampling duration coincide with the MIB collection period.

Let m be the number of bytes (including headers) in a short ping.

Let p be the number of bytes (including headers) in a long ping.

Let bs be the best short ping time (in seconds) that was observed during the sampling interval.

Let bl be the best long ping time (in seconds) that was observed during the sampling interval.

Let as be the average short ping time (in seconds) that was observed during the sampling interval.

Let al be the average long ping time (in seconds) that was observed during the sampling interval.

Then for each hop "h," the following calculations may be performed:

$$[(p-m)*2]/(bl-bs) = \text{the ping measured hop speed.}$$

The ping measured hop speed should be equal to the MIB or user documented hop speed, which was denoted above as "sh." If they match, then the MIB or user documented value is correct. If they do not match, additional pinging must take place to ensure that best possible ping results have been achieved and checking must be done to ensure that the ping's send and return path was exactly the hop in question and that the send and receive legs of the hop are both the same speed. If all of these are good and yet there is a mismatch with the MIB/documentation speed value, it is likely that the MIB/documentation value is wrong. In this case, if the link's actual speed is what is expected, then the MIB value and documentation value need to be corrected to ensure that management tool calculations work correctly. If the link speed is not what is expected, then the vendor or manager of the communications facility needs to be contacted to explain (and fix, as appropriate) the discrepancy. In any case, the MIB/documentation value should be made to match the actual link speed.

This process may ensure that the baseline speed of the hop is what is expected and that it is correctly documented so that all performance calculations may be reliable. At the completion of this step, it will have been verified that [(p−m)*2]/(bl−bs)=sh, where the left side of the equation is ping-based, and the right side is MIB/user documentation based.

Once the hop speed "sh" is verified (and corrected if necessary) for all hops along the path, the next step in using pings to verify the MIB-based analysis is to calculate the network's fixed latency "F." Fixed latency is the total propagation and device delay along the network as determined by pinging. The calculation is:

$$bl-(bl/sh)=F.$$

In order to verify the MIB baseline analysis, a check is performed to determine whether or not, F=(D+P).

If yes, then the ping test measurement of the network hop's device latency plus propagation delay matches the MIB/documentation analysis, and the baseline values are correct. If there is a mismatch between F and the sum of D+P, then it must be determined whether there has been a problem with the stabilization of pinging (unlikely because of the speed match check in the prior step) or, more likely, whether the network hop's actual length is longer than the distance attributed to the link in the MIB or documentation-based value. (It should also be verified that device latencies are not excessive—one way to do this is to self-ping or ping over very short distance and determine if there are elongated ping times). The usual case is that the link's actual distance is different than documented, and the correction for an incorrect MIB/documentation distance value is performed as follows:

$$(F-D)=P' \text{(where } P' \text{ is the ping-derived hop propagation delay).}$$

The correct link distance value=(186000*P')/(2*2.1), and this is the corrected value that should be used in the MIB/documentation calculations.

If it had been determined that the device latency value is faulty, self-ping testing or ping testing over a very short connection will provide a corrected device latency value to substitute for the MIB/documentation calculation (rule of thumb) used in the MIB calculations of 0.001 ms for round trip device latency.

These steps provide a method for verifying and correcting MIB-based network baseline calculation input. At the completion of these steps, baselining calculations can be performed with great confidence.

Verifying and Correcting MIB-Based Current Network Evaluations

Ping analysis of current network evaluation for the purpose of verifying the MIB-based analysis of current network performance consists of (without loss of generality) calculating:

$$al-bl=\text{ping detected network hop queue delay, denoted as } \text{``}pq.\text{''}$$

One way to calibrate the MIB-based evaluation of current network conditions is to model the ping results over a sampling period in question and see whether the MIB-modeling results match up with the observed ping results.

The MIB-based calculation for the l bytes round-trip in a long ping on network hop h is:

$$[(l \text{ bytes}*8*2)sh]+(D+P)=bl \text{ (true because of previous calibration step)}$$

Let "Tw" denote the queuing theoretical value for average wait time. Then if the MIB and ping results for network current conditions match, bl+Tw should equal al, and thus it needs to be determined whether Tw=al−bl. If so, then the MIB and ping-derived analyses square with each other, and the models are calibrated and cross-checked correctly.

Tw may be calculated from the MIB values as follows:

1) calculate hop utilization using bytes in and out on the interface over the sampling period. (Note, without loss of generality assume that the link is half duplex)

(bytes in+bytes out)*8/(sh*number of seconds in MIB sampling period)=hop utilization during the sampling period.

2) calculate the average message size on hop h during the sampling period:

(bytes in+bytes out)/(packets in+packets out)=average message size on hop h during the sampling period.

3) by queuing theory, where uh denotes utilization of hop h during the sampling period, $$uh/(1-uh)=\text{number of messages (of average hop h size on hop } h \text{) on queue on hop } h$$

4) then average number of messages on queue*8/sh=Tw.

5) determine whether Tw=a1–b1. If so, then the ping and MIB analyses correlate and the results of each are reliable. If not, then check MIB counters for overruns or other problems, and check ping results for any anomalies. If checking within this sample period does not produce any obvious reason for the discrepancy, then check other sample periods to determine whether the MIB and ping results for utilization ever match. For mismatching instances, the MIB values should be taken as representative of the actual state of the system relative to its handling of actual end user traffic, because it is most likely that the reason for the discrepancy is that the ping results on this hop are being skewed by low priority handling that is not affecting regular user traffic.

What-if modeling may be easily appended by merely allowing user changes to speed, utilization and latency fields. A distance addition and subtraction factor to adjust propagation delay to reflect client or server moves may also be easily added by using the "rule of thumb", provided previously, and applying the results to all calculations, including the tuning calculations. Thus, it is apparent that from MIB and ping data, the system and method provides for a full range of analytic and predictive performance, tuning, and modeling results. Orderly management is greatly facilitated when this range of information is available. Consider the case where a user complains about performance. Regardless of whether the application is conversational, bursty, or streaming, this invention enables orderly dually verified analytics.

Figure 3:
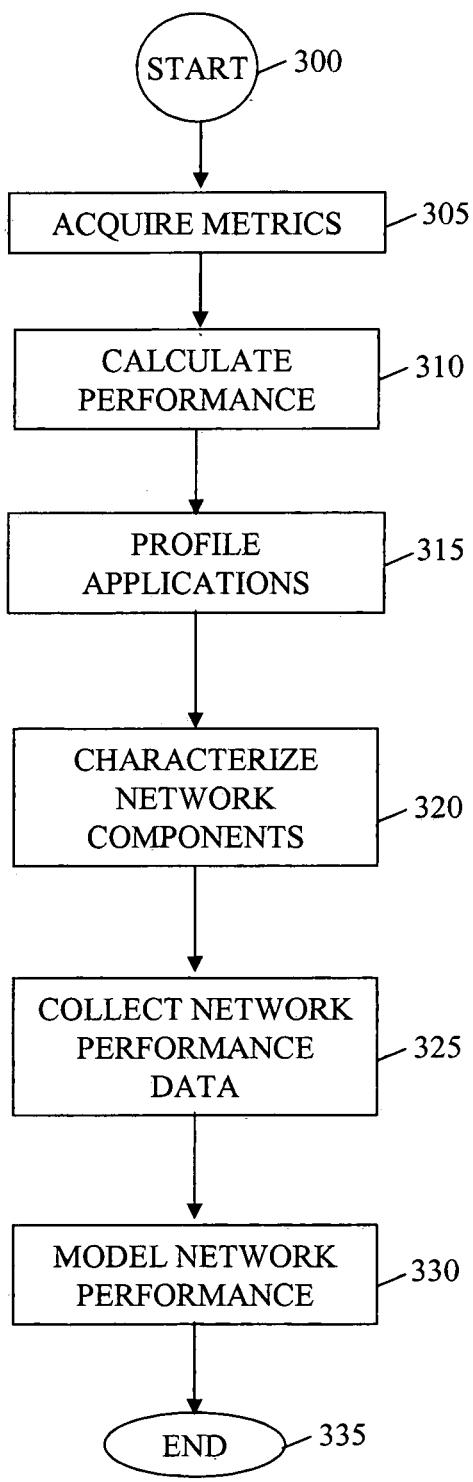
FIGS. 3-10 are flow diagrams of embodiments showing steps for using the invention.

FIG. 3 is a flow diagram of an embodiment showing steps for using the invention, starting at step 300. FIG. 3 (as well as FIGS. 4-10) may equally represent a high-level block diagram of components of the invention implementing the steps thereof. The steps of FIG. 3 (as well as FIGS. 4-10) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 3 (and the other flow diagrams) may also be implemented by the embodiment of FIG. 1.

Continuing with FIG. 3, at step 305, metrics for network component(s) and/or hop(s) may be acquired to characterize the components and/or portions (or the entire) network. At step 310, performance calculations may be computed from the values of the metrics including hop and end to end performance. At step 315, one or more applications may be profiled for determining characteristics of traffic presented to the network by the applications.

At step 320, network components may be identified and network performance data may be computed and/or collected based on network component's fixed and/or variable metrics which may be derived from pings, MIB data, trace data and/or user documentation. At step 325, other network performance data may be collected through traces or measurement, such as, for example, latency, delays, throughput. At step 330, network performance may be modeled. This model may include characterization of one or more network components, individual hops, multiple hops, end to end, associating diminished performance to network components, projecting effects of changed components, application impacts on the network, or the like. At step 335, the process ends.

Figure 4:
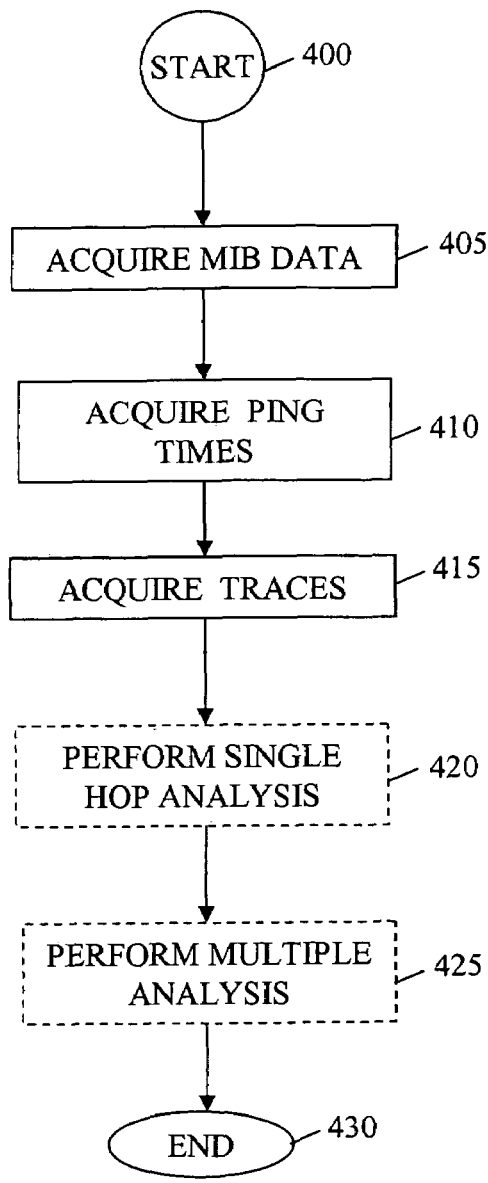

FIG. 4 is a flow diagram of an embodiment showing steps of using the invention, starting at step 400. At step 405, MIB data and/or user documentation data may be acquired for one or more network devices. At step 410, ping times may be acquired for one or more hops or to one or more network devices. At step 415, traces may be acquired for one or more network devices. At optional step 420, one or more single hop analyses may be performed. At optional step 425, one or more multi-hops analysis may be performed. At step 430, the process ends.

Figure 5:
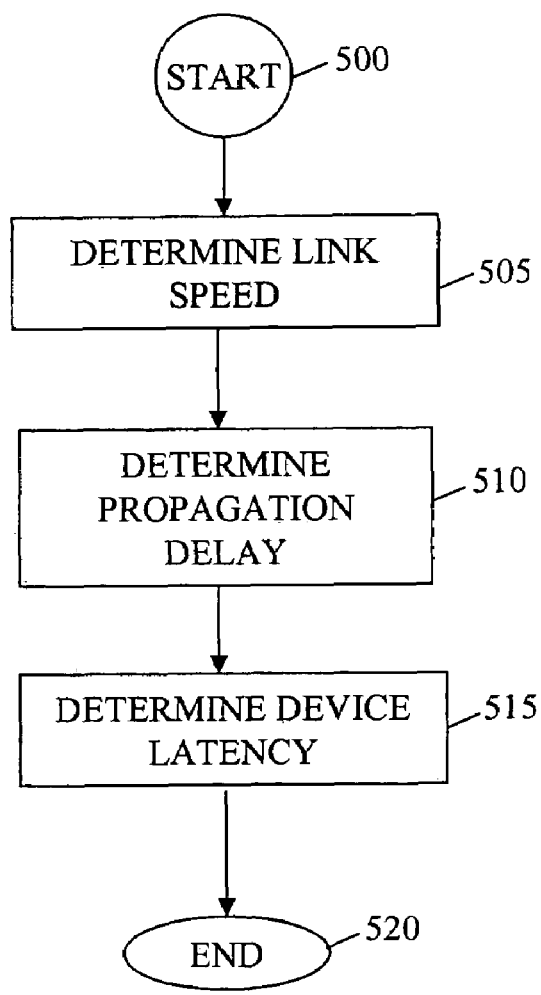

FIG. 5 is a flow diagram of an embodiment showing steps of the invention, starting at step 500. At step 505, the speed of one or more links may be determined. At step 510, propagation delay for one or more hops or end to end may be determined. At step 515, device latency may be determined for one or more network components. At step 520, utilization may be determined for the network or portions of the network. At step 525, the process ends.

Figure 6:
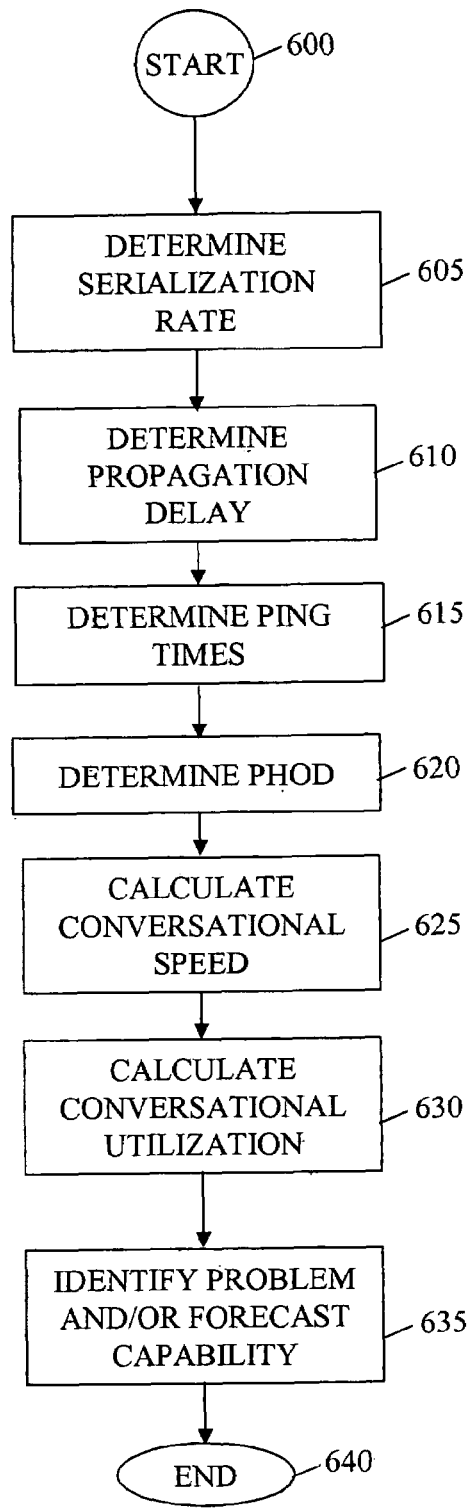

FIG. 6 is a flow diagram of an embodiment showing steps of using the invention, starting at step 600. At step 605, serialization rate may be determined for one or more hops or end to end. At step 610, propagation delay may be determined for the network or portions of the network. At step 615, one or more ping values may be determined to one or more devices across one or more hops. At step 620, the PHOD may be determined over one or more multi-hops or end to end. At step 625, a conversational speed for the network or conversational speeds for portions of the network may be determined. At step 630, a conversational utilization for the network or conversational utilization for portions of the network may be determined. At step 635, network problems may be determined or performance forecasts generated (e.g., for changes in the network) based upon the model created from one or calculations or one or more measurements. This determination or forecast may be achieved, in embodiments, by comparing measured and/or computed performances to expected or pre-agreed performance requirements for the network or portions of the network. At step 640, the process ends.

Figure 7A:
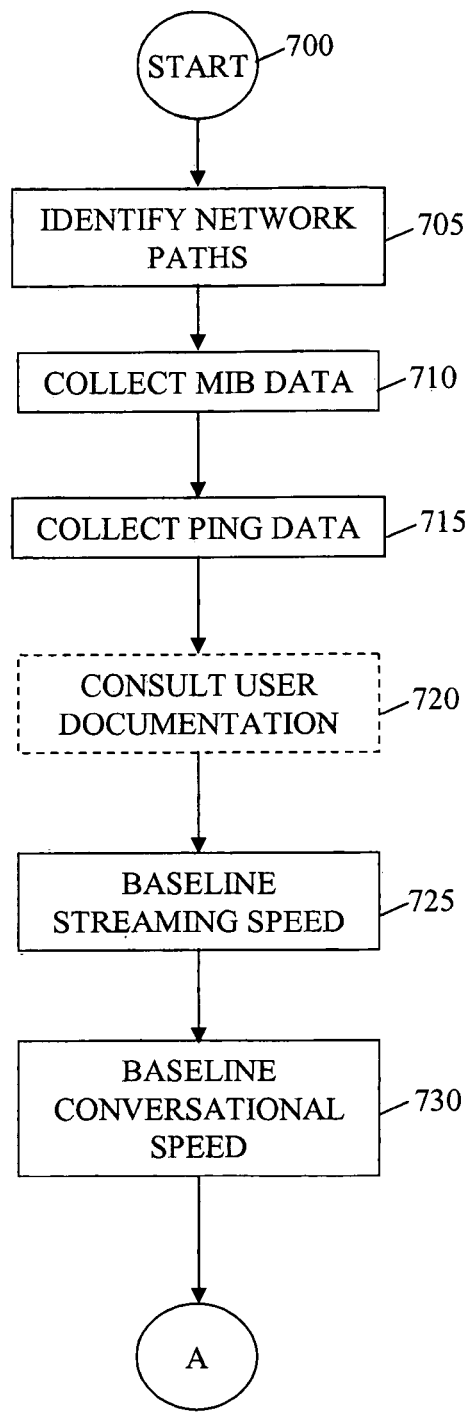
Figure 7B:
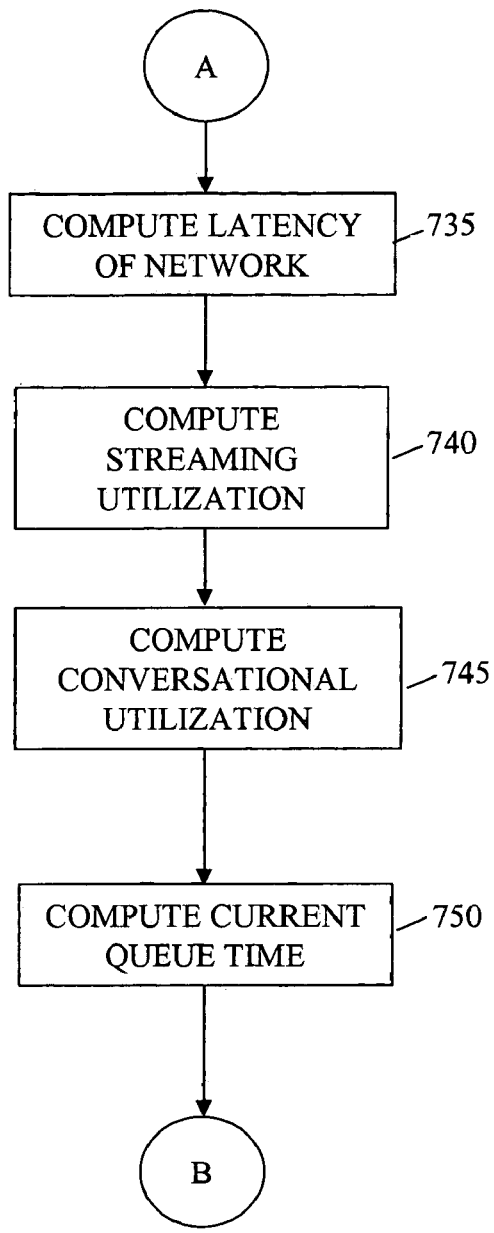
Figure 7C:
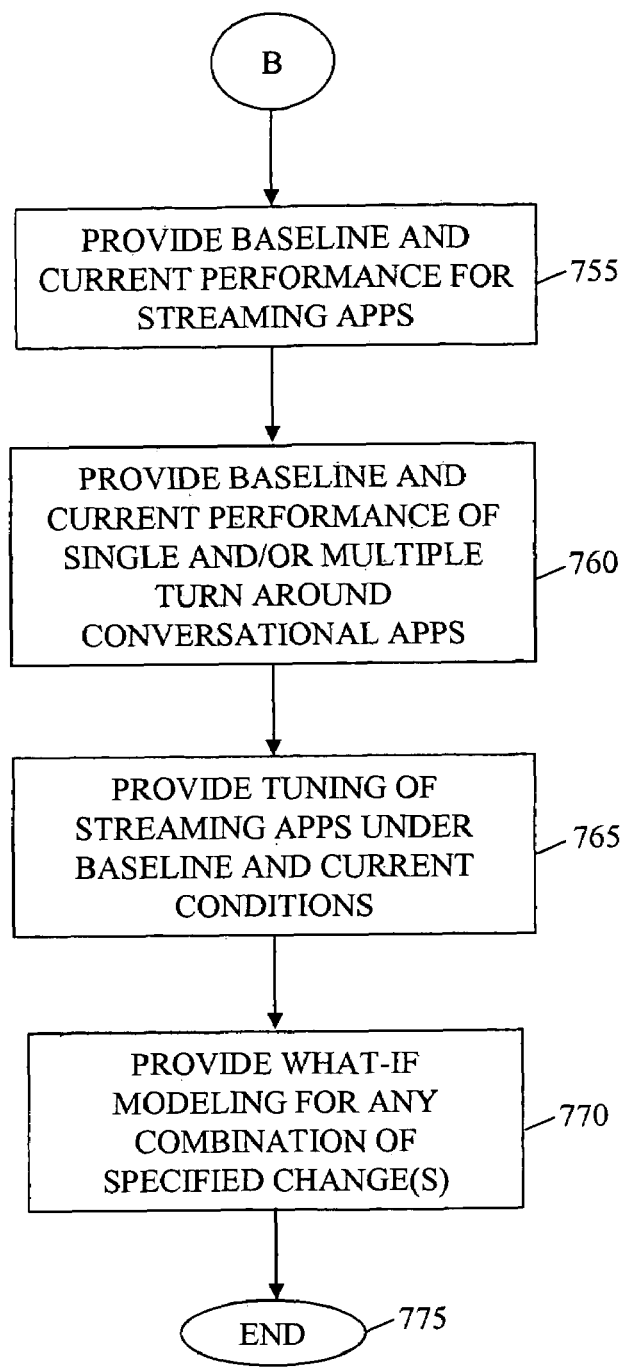

FIGS. 7A-7C are flow diagrams of an embodiment showing steps of using the invention, starting at step 700. At step 705, one or more network paths (which might be end to end) may be identified for analysis or modeling. At step 710, MIB data may be acquired for one or more network devices along the one or more paths. At step 715, ping data may be collected from one or more network devices in the one or more paths. At optional step 720, user documentation may be consulted to determine characteristics of the network along the one or more paths. At step 725, streaming speed(s) may be baselined along the one or more paths. At step 730, conversational speed(s) may be baselined along the one or more paths.

At step 735, latency of the network along one or more paths may be computed. At step 740, streaming utilization may be computed along the one or more paths. At step 745, a conversational utilization may be computed along the one or more paths. At step 750, current queue time(s) may be computed for one or more network devices along the one or more paths. At step 755, a baseline and current performance may be generated for streaming applications. At step 760, baseline and current performance of single and/or multiple turnaround conversational applications may be generated. At step 765, tuning recommendations of streaming applications may be provided under baseline and current conditions for network window sizes and network buffers.

At step 770, what-if modeling may be provided for any proposed combination of metric parameter changes, such as, for example, speed changes, devices changes, configuration changes, a calculated metric, or the like, to ascertain potential impacts on performance along the one or more paths. Projecting a performance model based on changing one or more parameters (e.g., as requested by a user) and re-computing any performance calculation provides a delta comparison of performance with a baseline, or known condition, as compared to proposed changes in the network. The performance model may be displayed on the dashboard or similar display device. Alternatively, bottleneck points may be identified along the one or more paths, if a calculation demonstrates unacceptable performance as compared to a predetermined performance criteria.

Figure 8:
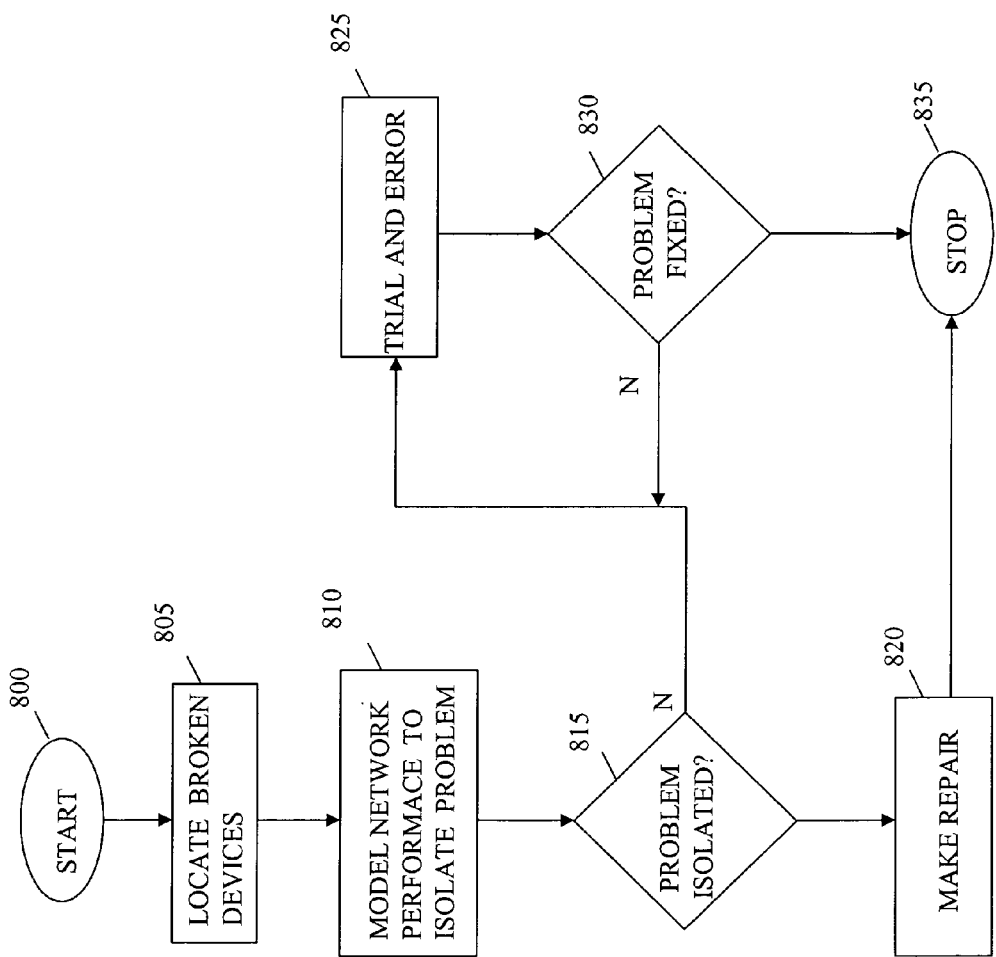

FIG. 8 is a flow diagram of an embodiment showing steps of the invention starting at step 800. At step 805, broken devices may be located based on reachability and autonomics, perhaps using a performance console or dashboard interconnected with a performance management server which may be running Netview™ or Openview™, for example. At step 810, the network performance may be modeled to locate instances of mathematical impairment (i.e., a measured or computed deficiency), typically based on measured or calculated network speed, latency, tuning and utilization issues.

At step 815, a check is made if the problem has been isolated. If so, then at step 820, a repair appropriate to the fault may be made and the process ends at step 835. If, however, the problem has not been identified or isolated, then at step 825, trial and error attempts may be tried to resolve the problem. At step 830, a check is made if a trial and error change has fixed the problem. If not, the trial and error process continues at step 825. If the problem is resolved, then the process ends at step 835.

Figure 9:
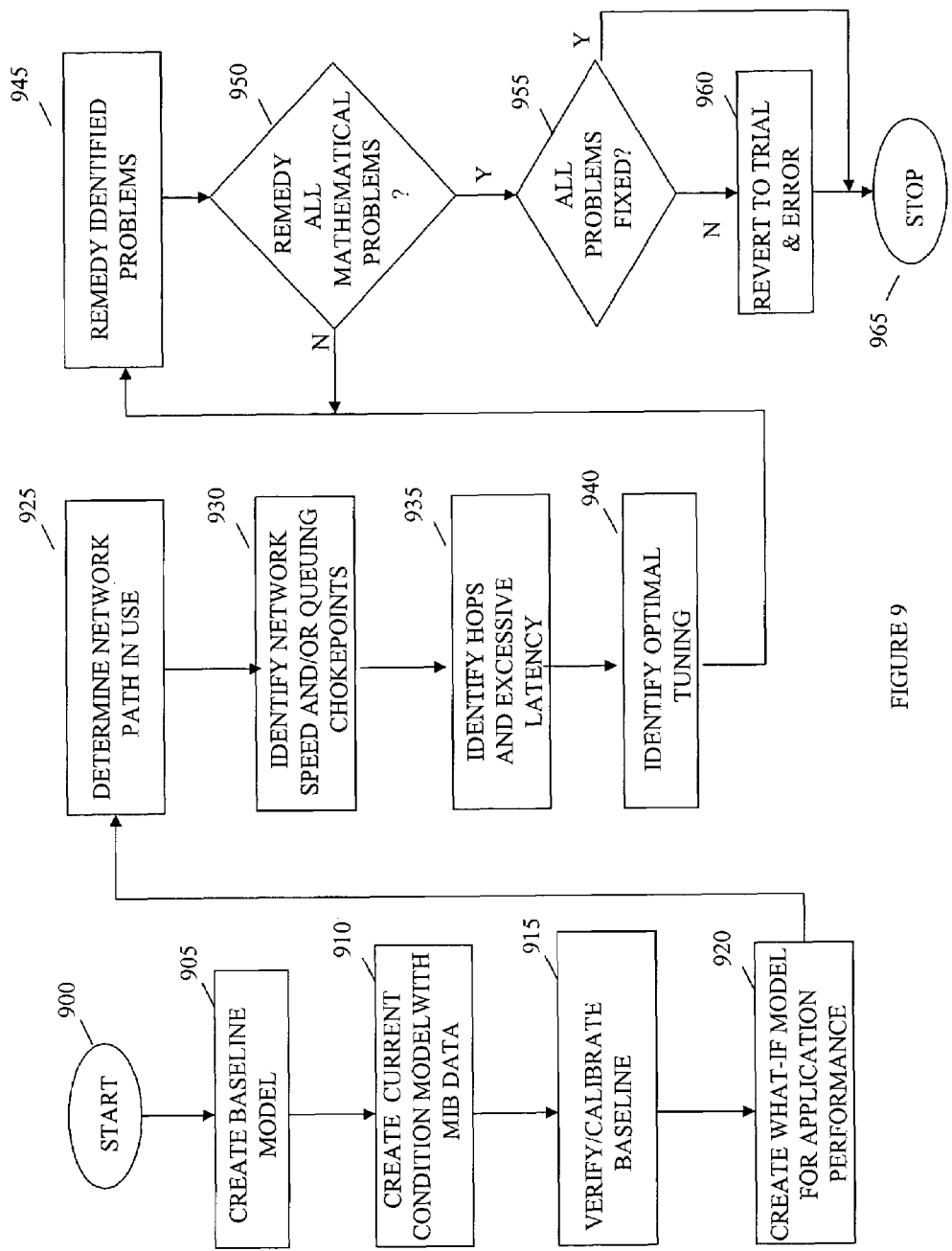

FIG. 9 is a flow diagram of an embodiment showing steps of using the invention starting at step 900. At step 905, a baseline model may be created using asset data (i.e., information about links and components in the network). At step 910, MIB data may be added to create a model of the network under current conditions. At step 915, the baseline and current performance model may be verified or calibrated using pinging techniques.

At step 920, a "what-if" model for application performance on network may be created for tuning. At step 925, one or more network paths in use associated with a suspected problem of poor performance may be determined based on for example, pinging, measured activity from tools, user documentation, analysis, or the like. At step 930, network speed and/or queuing chokepoints may be identified. At step 935, one or more hops and any excessive latency may be identified along the paths. At step 940, optimal tuning criteria may be identified (e.g., changing parameters associated with a network device or reallocation of one or more resources, or reconfiguring the network, etc.). At step 945, any identified problems may be remedied according to industry norms, if any, internally developed standards or SLAs, for the identified problems.

At step 950, a check is made whether all the mathematical problems have been resolved. If not, processing continues at step 945. Otherwise, if so, at step 955, a check is made whether all problems at step 955 have been fixed. If not, at step 960, trial and error problem resolution may commence until resolution and/or the process ends at step 965. If, however, all problems have been addressed the process ends at step 965, without trial and error attempts.

Figure 10:
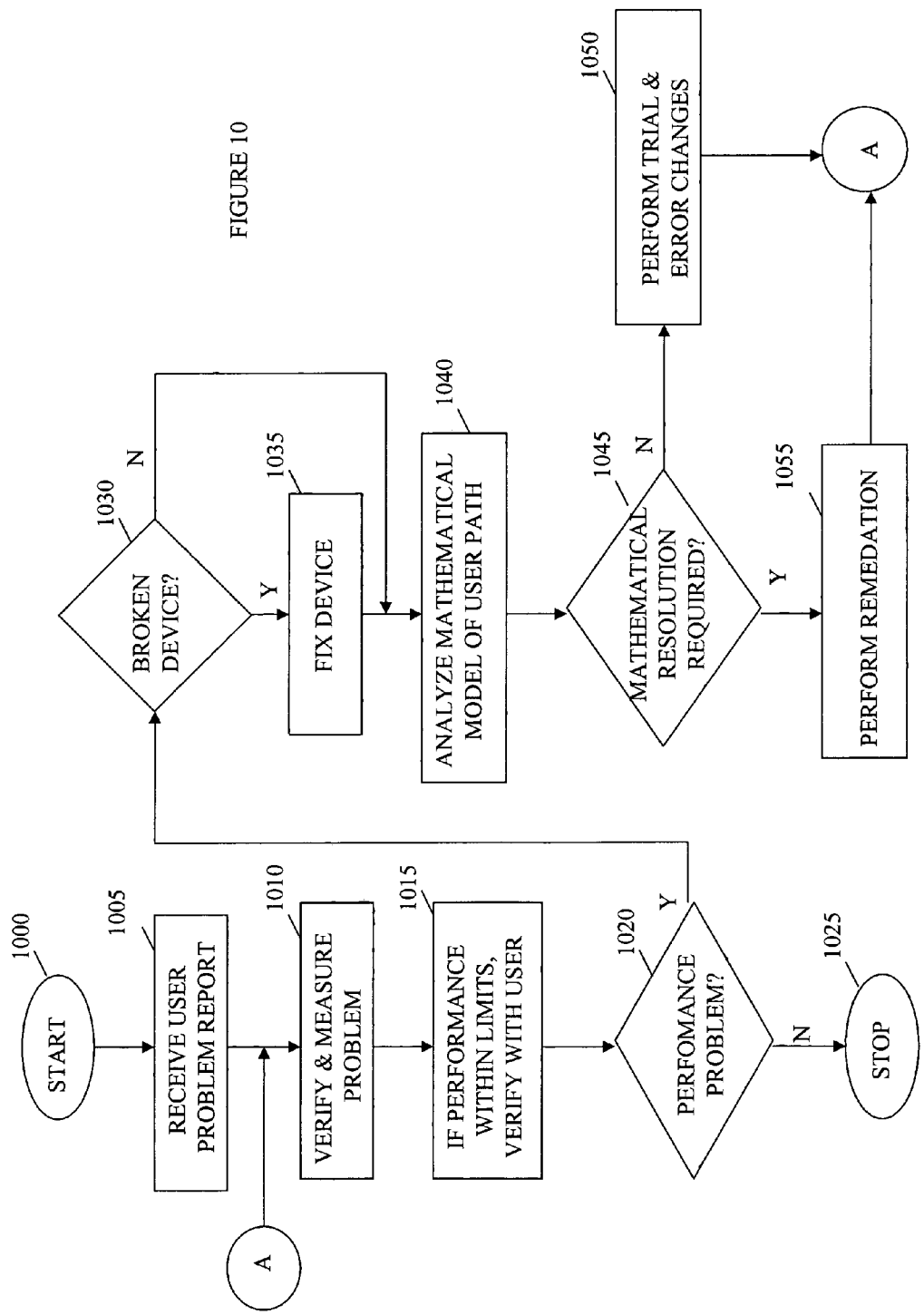

FIG. 10 is a flow diagram of an embodiment showing steps of using the invention, starting at step 1000. At step 1005, a user report may be received to initiate a problem resolution session. At step 1010, the reported problem may be verified and/or measured. At step 1015, when the verification shows that performance is within limits (e.g., within SLA), the problem report may be addressed with the user to assure that the reported issues are still correct and/or valid from the user's viewpoint.

At step 1020, a decision is made whether the measured or observed performance is a problem. If not, the process ends at step 1025. Otherwise if deemed a problem, at step 1030, a check is made, perhaps via the RAG console, to determine whether a device is broken or unreachable. If not broken, processing continues at step 1040. If the device is broken, then at step 1035 the device is fixed or otherwise made reachable.

At step 1040, the user path may be analyzed using a mathematical model according to mathematical measurements or computations based on measured or calculated network speed, latency, tuning and utilization issues. At step 1045, a determination may be made whether a mathematical resolution (e.g., a parameter alteration on one or more devices or the like) may be accomplished. If not, trial and error attempts may be performed to resolve the problem and the processing continues at step 1010. If so, then at step 1055, mathematical based remediation or modifications may be performed. The process continues at step 1010.

While the invention has been described in terms of embodiments, those skilled in the art will recognize that the invention can be practiced with modifications and in the spirit and scope of the appended claims.

What is claimed is:

1. A method of managing a network, comprising the steps of:

modeling performance of a network having one or more network components to locate an instance of a mathematically impaired network component based on any combination of network speed, latency, tuning and utilization;

providing predictive modeling of potential changes to the network, including effects on performance of additional traffic, link speed increases, and chances in distance between clients and servers, thereby increasing a speed of problem resolution of one or more network components that slow overall performance across network connections due to queue build up, propagation delay, or slow serialization or processing of network traffic; and modifying one or more parameters associated with the one or more network components based on the modeling to improve network performance.

2. The method of claim 1, further comprising the step of employing trial and error changes to remedy a network problem, when the modeling fails to locate the instance of the mathematically impaired network component.

3. The method of claim 1, wherein the mathematically impaired component comprises a measured or computed deficiency associated with the one or more network components.

4. The method of claim 1, further comprising reconfiguring the one or more components to remedy the network problem based on the modeling.

5. The method of claim 1, further comprising projecting what effect changes to the one or more network components on a link in the network has on performance of an end-to-end path.

6. The method of claim 1, wherein the modeling performance includes baseline performance and current performance levels of the network.

7. The method of claim 1, wherein the predictive modeling is what-if modeling.

8. A method for managing a network performance, comprising the steps of:

creating a baseline network model of a network having one or more network components;

adding MIB data to the baseline network model to create a model of current conditions;

pinging a path in the network to verify the model of current conditions;

identifying optimal tuning for the path based on the model of current conditions verified by the pinging;

modifying one or more parameters for at least one of the one or more network components based on the identified optimal tuning to improve network performance at least along the path; and creating a predictive model of potential changes to the network, including effects on performance of additional traffic, link speed increases, and chances in distance between clients and servers, thereby increasing a speed of problem resolution of one or more network components that slow overall performance across network connections due to queue build up, propagation delay, or slow serialization or processing of network traffic.

9. The method of claim 8, further comprising the steps of:
identifying hops in the network with excessive latency; and
identifying network speed and queuing chokepoints in the path.

10. The method of claim 8, further comprising determining the network path in use for suspected instances of current poor performance based on at least any one of user documentation, detected activity and measured performance.

11. The method of claim 8, further comprising the steps of:
remediating any mathematical problem including at least any one of a computed problem and a measured problem; and
verifying whether a change based on the remediating improves the network performance.

12. The method of claim 8, further comprising checking whether one of the one or more network components is broken or unreachable.

13. A system for managing networks, comprising:
means for modeling performance of a network having one or more network components to locate an instance of a mathematically impaired network component based at least on any one of network speed, latency, tuning and utilization;

means for providing predictive modeling of potential changes to the network, including effects on performance of additional traffic, link speed increases, and changes in distance between clients and servers, thereby increasing a speed of problem resolution of one or more network components that slow overall performance across network connections due to queue build up, propagation delay, or slow serialization or processing of network traffic; and means for modifying one or more network components including at least any one of a network component parameter and network component configuration based on the modeling to improve network performance at least along a path of the network.

14. The system of claim 13, further comprising means for employing trial and error changes to remedy a network problem when the means for modeling fails to locate the instance of the mathematically impaired network component.

15. The system of claim 13, wherein the mathematically impaired component comprises a measured or computed deficiency associated with the one or more network components.

16. The system of claim 13, further comprising means for reconfiguring the one or more components to remedy the network problem based on the modeling.

17. The system of claim 13, further comprising means for measuring and verifying a suspected problem in the network.

18. The system of claim 13, further comprising means for identifying hops and excessive latency in the network.

19. The system of claim 13, further comprising:
means for identifying optimal tuning for at least along the path; and
means for identifying speed and queuing chokepoints in the network.

20. The system of claim 13, further comprising:
means for creating a baseline model; and
means for creating a current condition model with management information base (MIB) data.

21. The system of claim 13, further comprising means for modeling network performance to isolate a performance problem.

22. A computer program product comprising a computer usable medium having readable program code tangibly embodied in the medium and executable by a computer, the computer program product includes at least one component to:
model performance of a network having one or more network components to locate an instance of a mathematically impaired network component based at least on any one of network speed, latency, tuning and utilization;
create a predictive model of potential changes to the network, including effects on performance of additional traffic, link speed increases, and changes in distance between clients and servers, thereby increasing a speed of problem resolution of one or more network components that slow overall performance across network connections due to queue build up, propagation delay, or slow serialization or processing of network traffic; and
modify one or more parameters associated with the one or more network components based on the modeling to improve network performance.

* * * * *